United States Patent Office 3,523,835
Patented Aug. 11, 1970

3,523,835
SURFACE TREATMENT OF METALS
Harold Leslie Turner, Southall, Middlesex, England, assignor to Joseph John Lorant, East Molesey, Surrey, England
No Drawing. Filed June 22, 1967, Ser. No. 647,953
Claims priority, application Great Britain, July 1, 1966, 29,619/66
Int. Cl. C23f 9/02
U.S. Cl. 148—6.24
27 Claims

ABSTRACT OF THE DISCLOSURE

Known processes used in cleaning oil, grease and other contaminants from ferrous metal sheet and other metal goods are described, for cleaning and preparing such goods for the reception of industrial finishes.

The invention contemplates as few as 4 operative steps and is based upon the use of a composition which effects degreasing, derusting and passivating in a single step. Compositions which can effect this are described in detail and are based upon a hydroxy or polyhydroxy carboxylic acid containing one or more carboxyl groups or a lactone of such an acid, e.g. malic acid or detal-gluconolactone, a non-ionic wetting agent selected from alkylphenol polyethoxylates and an ether of a sulpho-dibasic fatty acid.

The composition preferably has the form of an aqueous solution, desirably of pH 7 to 2, and can also contain an N-methyl-glycine derivative smut removal, alkali metal phosphates, to assist degreasing, buffer systems to maintain a selected pH, and accelerating agents to assist in forming a conversion coating.

---

This invention relates to the surface treatment of metals and is particularly concerned with the preparation of the surfaces of ferrous and other metal articles, stock and fabrications so that they are ready for painting or other protective industrial finishing.

In order to apply industrial finishes to goods made from ferrous metal sheet, castings, forgings and other forms, the surfaces must be rendered free from oil, grease and preservatives, completely freed from mill scale or from rust and, in the case of many articles, particularly those fabricated from sheet metal such as motor car bodies, domestic equipment and office furniture, the clean surface must then be chemically treated so as to provide a surface layer or coating which will bond the paint or other finish to the surface and inhibit the spread of rust below the paint surface from any points of accidental damage. Typically, such coatings consist of a layer of the insoluble phosphates or oxalates of zinc, iron or manganese, or mixtures of phosphates or mixtures of oxalates.

Many steps are required to produce such a coating on a sound and clean surface, starting from metal which has rusted in store or in the course of processing. The rust removal may be effected by an acid or an alkaline process, and the main steps in known and typical processes employed nowadays are as follows:

| (A) Acid de-rust zinc phosphate | (B) Acid de-rust iron phosphate | (C) Alkaline de-rust zinc phosphate | (D) Alkaline de-rust iron phosphate |
|---|---|---|---|
| (1) Degrease. | Degrease. | Alkaline de-rust. | Alkaline de-rust. |
| (2) Water wash. | Water wash. | Water wash. | Water wash. |
| (3) Acid pickle. | Acid pickle. | Degrease. | Water wash. |
| (4) Water wash. | Water wash. | Water wash. | Combined phosphate degrease. |
| (5) Degrease. | Combined phosphate degrease. | Water wash. | Combined phosphate degrease. |
| (6) Water wash. | Combined phosphate degrease. | Phosphate. | Water wash. |
| (7) Water wash. | Water wash. | Water wash. | Passivate rinse. |
| (8) Phosphate. | Passivate rinse. | Passivate rinse. | Dry off. |
| (9) Water wash. | Dry off. | Dry off. | |
| (10) Passivate rinse. | | | |
| (11) Dry off. | | | |

Depending on the quality of anti-corrosion coating required, 8 or 11 stages of operation are needed. The known processes are therefore relatively complex and, because of the high number of steps involved, are relatively expensive and so contribute materially to the cost of goods made from sheet steel and other ferrous metals. Though the processes summarised above under (C) and (D) are shorter in having the least steps, they are not preferred, because their common feature of an alkaline derusting step gives a coarse phosphate coating of poor quality.

The operation on ferrous metals of the zinc phosphate processes already referred to gives rise to a sludge of insoluble ferric phosphate, which forms a heavy heat-insulating coating on heating coils and can cause sprays in a spray-operated system to become blocked. Phosphating plant must, therefore, either be cleaned out at frequent intervals, or expensive ancillary equipment must be provided to filter the sludge and keep the volume down to an acceptable level. It is a feature of this invention that the solutions operate without the production of sludge.

The method of applying a coat of paint to a steel or iron surface by the use of electric current, known as electropainting or electrophoretic painting, suffers from the defect that iron is anodically removed from the surface and deposited in the paint coating in the form of brown staining, which is objectionable when it occurs in light-coloured paints which cannot therefore be applied by the above processes. The presence of an iron or zinc phosphate coating of the conventional type does not give any reduction of the staining. The coating formed by the solution of the invention produces a considerable reduction in the amount of staining.

It is an object of the invention to provide a process of surface treatment which produces results at least comparable with those of the known processes above and yet involves fewer steps and minimises the abovementioned objectionable features of the known processes.

The references above to known processes refer to ferrous metal goods and the treatment of these forms an important part of the present invention. However, corrosion and paint adhesion problems also arise with other metals and the benefits of the invention can also be obtained in the surface treatment of aluminium and its alloys.

According to one aspect of the invention, a composition is provided for effecting surface-treatment of metals, which comprises a hydroxy or polyhydroxy carboxylic acid containing one or more carboxyl groups or a lactone of such an acid, a non-ionic wetting agent selected from alkyl-phenol polyethoxylates and an ether of a sulpho-dibasic fatty acid.

Preferably, the composition is in the form of an aqueous solution.

According to another aspect of the invention, a process is provided for the surface treatment of a metal, which comprises the step of contacting the surface with a treating agent which comprises a solution which contains a hydroxy or polyhydroxy carboxylic acid containing one or more carboxyl groups or a lactone of such an acid, a non-ionic wetting agent selected from alkyl-phenol polyethoxylates and a salt of a sulpho-dibasic fatty acid half ester of a fatty alcohol polyglycol ether, in order to effect degreasing, derusting and formation of a conversion coating upon the metal surface.

Preferably, the treating agent has a pH value in the range of 7 to 2, the actual value being selected (preferably 4.0 to 5.0 or 2.0 to 3.0) according to whether the major aim is degreasing and derusting, or the production of a conversion coating.

Preferably, the solution contains, as the salt of the dibasic sulpho-acid derivative, the disodium salt of the half ester of sulpho-succinic acid and an aliphatic alcohol polyglycol ether, for example.

Many steels produce a surface contamination of finely-divided oxides and carbides, commonly referred to as "smut," when the surface is contacted with chemical treatment agents. This smut is objectionable in subsequent finishing processes. It is widely known that this smut cannot be removed by the commonly used alkaline or emulsion cleaners. In order to remove this smut it is preferable that the solution according to the invention contains a soluble salt of a derivative of N-methyl-glycine, for example the sodium salt of an N-acyl derivative of N-methyl-glycine. This is preferably present in the range of 1 to 3 grams per litre of the working solution. The N lauryl derivative is very effective.

It is also preferable for the solution to contain alkali metal phosphates, for example, trisodium phosphate and/or sodium tripolyphosphate, to assist the degreasing action of the solution when this is required due to the nature of the soil on the work processed.

It is also preferable for the pH of the solution to be adjusted and/or controlled by the inclusion of a buffer system, which has to be compatible with the other ingredients. One such buffer system is sodium phosphate and phosphoric acid. This action may be combined with the addition of phosphates as described above.

A preferred addition to the solution is sodium nitrite or nitro-guanidine to act as an accelerating agent in the formation of the coating.

The hydroxy carboxylic acid or lactone appears to have a chelating effect on heavy metal ions and, in the case of ferrous metals for instance, this has a solubilizing effect on iron oxide and thus a derusting action. The preferred compounds used for this purpose include the gamma and/or delta lactones of gluconic and heptonic acids, i.e. lactones of polyhydroxy acids having 6 or more carbon atoms in the chain, or similar aliphatic hydroxy carboxylic acids, and malic acid.

A major advantage provided by the solutions of the invention is that they carry out three highly desirable functions, owing to their outstanding ability to effect degreasing, derusting and passivating in a single solution.

The invention can thus afford a full surface treatment system, which involves the following steps:

(1)          Degrease, derust and passivate
|
(2)                Water wash
|
(3)                Water wash
|
(4)                  Dry off Thus a system of surface treatment is provided, by which ferrous metals, aluminium or its alloys, can be cleaned of grease, corrosion products and other undesirable surface contaminants, washed and dried and left with a corrosion-resistant surface coating ready for painting or other further treatment in not more than 4 steps. The invention can thus achieve the same results as known processes which necessitate at least twice as many separate steps. It has also been found that the solutions of removing oxide and tarnish from yellow metals, giving a clean bright surface which retains its lustre for a considerable period, as compared with an untreated specimen.

In order to reduce the work load on the first or conversion stage, it may be advantageous in actual works practice to duplicate the stage so that the losses from the initial tank of solution are replenished from the second tank, which is maintained at the preferred strength by the addition of fresh solution.

The hydroxy or polyhydroxy carboxylic acid or lactone, preferably delta-glucono-lactone or delta-heptono-lactone, is desirably present in the range of 10 to 30 g./l. in the working solution. When malic acid is used as the organic acid constituent of the solution, it is desirably present in the range of 7.5 to 30 g./l. of the working solution.

The non-ionic wetting agent preferred is a tertiary-butyl-phenol 7–8 mol ethoxylate, i.e. an ethoxylated derivative of tert. butyl-phenol containing 7–8 ethoxy residues per molecule. A suitable amount is in the range of 2.5 to 10 g./l. of working solution (treating agent).

The salt of a sulpho-dibasic fatty acid half ester of a fatty alcohol polyglycol ether included in the composition is preferably the di-sodium salt of the lauryl alcohol polyglycol ether half-ester of sulpho-succinic acid. This component is preferably present in an amount in the range of 2.5 to 10 g./l. of the working solution.

Where the solution includes an alkali metal phosphate, this can be present in widely varying amounts up to saturation. For instance, sodium tripolyphosphate is desirably present in an amount in the range of 50 to 70 g./l. of solution, or generally in amounts within the solubility limits of the phosphate.

The pH of the solution is preferably acid or neutral i.e. up to pH 6.6 or possibly a little higher, i.e. up to pH 7, though a particularly useful solution is one buffered to have a pH in the range of 4.5 to 5.0.

The process is preferably carried out by sequential treatment of the articles in an apparatus providing a first station where the articles are treated, e.g. by immersion in or by spraying with the special treating agent; this can provide either for immersion in the degreasing, derusting and passivating solution at an operating temperature, of, say 50°–60° C., or for spraying of the articles while stationed over a recovery tray or while hung on a conveyor passing them before spraying jets, arrangements being made to recover and re-use the solution sprayed in excess or draining from the treated surfaces, again using the solution at 50°–60° C., the later treatment would then typically involve a first cold running water wash, a second hot or cold water wash and drying, e.g. by holding the treated and washed articles in a warm air stream or by conveying them through an oven.

It is known that certain polyhydroxy long-chain mono-

EXAMPLES 3–11

The following compositions also illustrate the invention, all amounts being given in g./l. of working solution:

| Example No | 3 | 4 | 5 | 6 | 7 | 8 | 9 | 10 | 11 |
|---|---|---|---|---|---|---|---|---|---|
| Sodium tripolyphosphate | 50 | 60 | 70 | 70 | 60 | 50 | | | |
| Delta-heptono or deltaglucono lactone | 50 | 15 | 20 | | | | | | |
| Malic acid | | | | 30 | 30 | 40 | 7.5 | 15 | 30 |
| Fatty alcohol polyglycol ether half ester of a sulfodibasic acid salt | 5 | 7.5 | 5 | 5 | 7.5 | 10 | 2.5 | 5 | 10 |
| Tert. butyl phenol 7-mol ethoxylate | 5 | 7.5 | 5 | 5 | 7.5 | 10 | 2.5 | 5 | 10 |
| N-acyl derivative of N-methylglycine | 1 | 1.5 | 1.5 | 1 | 1 | 1.5 | 1 | 2 | 3 |
| Sodium nitrite or nitroguanidine | 1 | 1 | 1 | 1 | 1 | 1 | 1 | 1 | 1 |
| pH | 7.0 | 6.6 | 5.6 | 4.7 | 4.4 | 4.0 | 2.65 | 2.35 | 2.10 | basic carboxylic acids and their lactones have a chelating effect on iron, but these substances do not form corrosion-resistant coatings in the conditions hitherto used for derusting; the invention may be regarded as the incorporation in the same solution of materials which have such a derusting property with other materials, so that the solution also has a detergent or degreasing function and the ability to form an insoluble corrosion resistant coating, which inhibits the renewal of corrosion, if the articles are exposed to air, or damaged after the application of paint.

The optimum concentration limits of components of the composition of the invention are set out below; the amounts are given in g./l. of the working solution.

Main components: G./l.
Glucono-delta-lactone and/or heptono-delta lactone (if present) _____ 10 to 30
Malic acid (if present) _____ 7.5 to 30
Tertiary butyl-phenol ethoxylate or other wetting agent _____ 2.5 to 10
Salt of a sulpho-dibasic fatty acid half ester of fatty alcohol polyglycol ether __ 2.5 to 10
Optional components:
Sodium tripolyphosphate _____ 50 to 70
Phosphoric acid (without malic acid) ____ 5 to 30
Phosphoric acid (with malic acid present) _____ 0 to 30
Oxidising accelerator _____ (1)
N-acyl derivative of N-methylglycine ____ 1 to 3

¹ From 1 g./l. upwards.

In order that the invention may be readily understood, the following examples are given by way of illustration:

EXAMPLE 1

G./l of working solution
(1) Sodium tripolyphosphate _____ 70
(2) Glucono-delta-lactone _____ 10
(3) Tertiary butyl phenol 7-mol ethoxylate _____ 10
(4) Sulphosuccinate half ester with a fatty alcohol (e.g. lauryl) polyglycol ether, sodium salt _____ 10
(5) Sodium nitrite _____ 1
(6) Phosphoric acid _____ 2

EXAMPLE 2

(1) Sodium tripolyphosphate _____ 50
(2) Tertiary butyl phenol 7-mol ethoxylate _____ 5
(3) Sulpho succinate half ester with a fatty alcohol (e.g. lauryl) polyglycol ether, sodium salt _____ 5
(4) Malic acid _____ 20
(5) Sodium nitrite _____ 1

In use, the formulation of Example 1 or 2 can be made up of a dry powder by mixing together the requisite quantities of ingredients (2), (3) and (4) (if desired, also with ingredient (5)); these dry compositions can be stored as required or can be compounded with the remaining ingredient(s) and admixed with the necessary amount of water to give the desired treating agent in the form of an aqueous containing the concentrations stated. The treating agent is then used as the first one or two stages of a four-stage or five-stage treatment, as described above.

I claim:
1. A composition for effecting surface-treatment of metals, which consists essentially of a hydroxy or polyhydroxy carboxylic acid containing one or more carboxyl groups or a lactone of such an acid, an alkyl-phenol polyethoxylate nonionic wetting agent, and a salt of a sulphodibasic fatty acid half ester of a fatty alcohol polyglycol ether.

2. A composition according to claim 1, which contains glucono-delta-lactone, heptono-delta-lactone or malic acid.

3. A composition according to claim 1, which is in the form of an aqueous solution.

4. A composition according to claim 1, which is in the form of an aqueous solution having a pH in the range from 2 to 7.

5. A composition according to claim 1, which is in the form of an aqueous solution having a pH of from 4.5 to 5.0.

6. A composition according to claim 1, which contains a buffer in order to maintain the pH substantially constant.

7. A composition for effecting surface-treatment of metals, in the form of an aqueous solution which contains at least one of glucono-delta-lactone and heptono-delta-lactone in an amount in the range of 10 to 30 g./l. of solution, malic acid in an amount in the range of 7.5 to 30 g./l. of solution, an alkyl-phenol polyethoxylate non-ionic wetting agent in an amount in the range of 2.5 to 10 g./l. of solution, and a salt of a sulpho-dibasic fatty acid half ester of a fatty alcohol polyglycol ether in an amount in the range of 2.5 to 10 g./l. of solution.

8. A composition according to claim 7, which contains an oxidizing accelerator which is at least one of sodium nitrite and nitro-guanidine.

9. A composition according to claim 7, which contains an oxidizing accelerator which is at least one of sodium nitrite and nitro-guanidine present in an amount of at least 1 g./l. of solution.

10. A composition according to claim 7, which contains an alkali metal phosphate.

11. A composition according to claim 7, which contains at least one of trisodium phosphate and sodium tripolyphosphate.

12. A composition according to claim 7, which contains at least one of trisodium phosphate and sodium tripolyphosphate in an amount in the range of 50 to 70 g./l. of solution.

13. A composition according to claim 7, which contains 1 to 3 g./l. of solution of an N-acyl derivative of N-methyl-glycine.

14. A process for surface-treatment of a metal, which comprises the step of contacting the metal surface with a treating agent which consists essentially of an aqueous solution containing a hydroxy or polyhydroxy carboxylic acid containing one or more carboxyl groups or a lactone of such an acid, an alkyl-phenol non-ionic wetting agent and a salt of a sulphodibasic fatty acid half ester of a fatty alcohol polyglycol ether, in order to effect degreasing, derusting and formation of a conversion coating upon the metal surface.

15. A process according to claim 14, in which the treating agent contains glucono-delta-lactone, heptono-delta-lactone or malic acid.

16. A process according to claim 14, in which the treating agent has a pH in the range from 2 to 7.

17. A process according to claim 14, in which the treating agent has a pH of 4.5 to 5.0.

18. A process according to claim 14, in which the treating agent contains a buffer in order to maintain the pH substantially constant.

19. A process according to claim 14, in which the treating agent contains an oxidizing accelerator which is at least one of sodium nitrite and nitro-guanidine.

20. A process according to claim 19, in which the accelerator is present in the treating agent in an amount of at least 1 g./l.

21. A process according to claim 14, in which the treating agent contains an alkali metal phosphate.

22. A process according to claim 21, in which the alkali metal phosphate is at least one of trisodium phosphate and sodium tripolyphosphate.

23. A process according to claim 22, in which the amount of phosphate present in the treating agent is in the range of 50 to 70 g./l.

24. A process according to claim 14, in which the treating agent contains 1 to 3 g./l. of an N-acyl derivative of N-methyl-glycine.

25. A process according to claim 14, in which the treating agent is contacted with the metal surface at a temperature of 50° to 60° C. and the surface-treated metal is then waterwashed and dried.

26. A process according to claim 14, in which the metal is a ferrous metal or aluminum or its alloys.

27. A process for surface-treatment of a metal, which comprises the step of contacting the metal surface with a treating agent which consists essentially of an aqueous solution containing at least one of glucono-delta-lactone and heptono-delta-lactone in an amount in the range of 10 to 30 g./l., malic acid in an amount in the range of 7.5 to 30 g./l., an alkyl-phenol polyethoxylate non-ionic wetting agent in an amount in the range of 2.5 to 10 g./l., and a salt of a sulphodibasic fatty acid half ester of a fatty alcohol polyglycol ether in an amount in the range of 2.5 to 10 g./l.

References Cited

UNITED STATES PATENTS

| | | | |
|---|---|---|---|
| 2,250,508 | 7/1941 | Thompson et al. | 148—6.2 X |
| 2,433,311 | 12/1947 | Waugh | 148—6.24 |
| 2,809,906 | 10/1957 | Baecker et al. | 148—6.15 |

RALPH S. KENDALL, Primary Examiner

U.S. Cl. X.R.

106—14; 134—3; 148—6.14, 6.17